H. LUBÉ.
TONE ARM BEARING FOR TALKING MACHINES.
APPLICATION FILED JAN. 3, 1920.

1,378,965.

Patented May 24, 1921.

Henry Lubé Inventor
By his Attorney
Ivan E. A. Konigsberg

UNITED STATES PATENT OFFICE.

HENRY LUBÉ, OF COLLEGE POINT, NEW YORK.

TONE-ARM BEARING FOR TALKING-MACHINES.

1,378,965.   Specification of Letters Patent.   Patented May 24, 1921.

Application filed January 3, 1920. Serial No. 349,190.

*To all whom it may concern:*

Be it known that I, HENRY LUBÉ, a citizen of the United States, and resident of College Point, in the county of Queens and State of New York, have invented certain new and useful Improvements in Tone-Arm Bearings for Talking-Machines, of which the following is a specification.

This invention relates to improvements in tone arm bearings for talking machines. The object of the invention is to provide a generally improved bearing adapted to be manufactured at low cost, easily assembled and whereby a large number of balls in the ball bearings may be saved.

Accordingly, my invention comprises a bearing for tone arms as hereinafter described and as illustrated in the accompanying drawing, in which—

Figure 1:
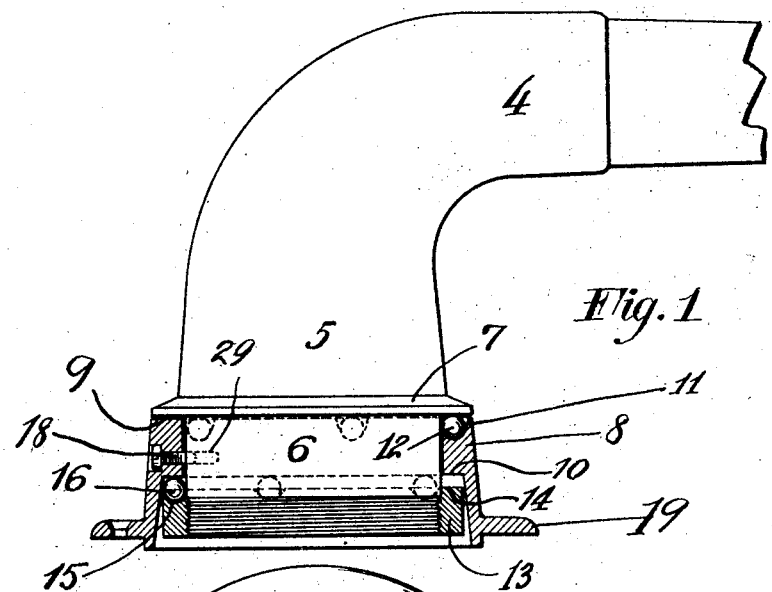
Figure 1 is a view of a tone arm bearing embodying my invention and with parts in section and parts broken away.
Figure 2:
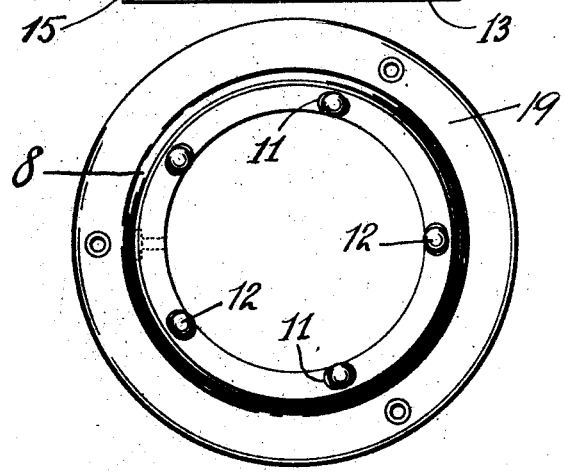
Fig. 2 is a plan view of the bearing sleeve.
Figure 3:
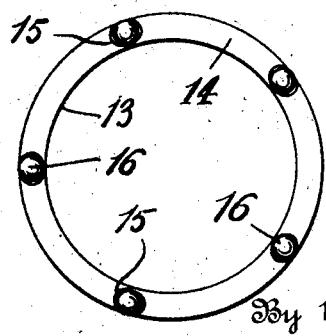
Fig. 3 is a plan view of the bearing collar.

In the said drawing, the reference numeral 4 denotes the tone arm which is provided with a downwardly extending portion 5 forming an exteriorly threaded neck 6 below an overhanging flange 7. The tone arm rests with its flange 7 on a ball bearing comprising the bearing sleeve 8 having a flange 19 for attachment to the talking machine cabinet, not shown.

The said bearing sleeve 8 is provided with an upper and a lower annual flat surface 9 and 10 respectively.

The upper surface 9 is provided with a plurality of recesses or sockets 11, 11 in which rest balls 12, 12, as shown. The flange 7 rests directly on the said balls 12.

On the threaded neck 6 is screwed a bearing collar 13 provided in its upper surface 14 with a plurality of recesses or sockets 15, 15, containing the balls 16, 16.

The screw 18 and slot 29 are means for limiting the swinging movement of the tone arm as is well known.

In assembling the tone arm and bearing, the balls 12 are laid in the sockets 11 and the tone arm neck 6 inserted within the sleeve 8 whereby the flange 7 is brought to rest upon the balls 12. Thereafter the balls 16 are laid in the sockets 15 in the collar 13 and the latter is screwed on to the neck until the balls 16 touch the under flat surface 10 of the sleeve 8.

When thus assembled as shown in Fig. 1, it will be seen that the tone arm runs on the two ball bearings 12 and 16 and is also locked against vertical movement within the sleeve 8.

It has been found that quite a considerable saving in the manufacture of the tone arm bearings may be obtained by eliminating the large number of balls heretofore thought necessary and using only a few balls such as shown herein. The sockets in the sleeve and the collar as well as the finished surfaces 9, 10 and 14, may be cast and do not require any special finishing.

It will also be understood that I do not limit myself to any specific number of balls nor to any particular shape or form of sockets, but that changes may be made within the scope of the appended claim.

I claim.

The combination of an outer relatively fixed tubular member and an inner relatively movable tubular member adapted to fit and rotate within said outer member, which latter is provided with an upper flat surface and an upper interior straight wall adjacent the said flat surface, a plurality of sockets formed in said outer tubular member, antifriction balls in said sockets arranged to project from the latter upwardly above the said flat surface and inwardly beyond the said straight wall, a lateral shoulder formed in said inner tubular member and adapted to rest upon the said balls, said inner tubular member being further provided with a vertical portion adapted to contact with the said antifriction balls on the sides thereof, an annular flat shoulder formed on said outer tubular member below the said interior straight wall, said outer tubular member being further formed with a tapering inside wall below the said annular flat shoulder, a threaded portion at the lower end of said inner tubular member, a ring screwed thereon, a plurality of sockets formed in the said ring, antifriction balls in said sockets in the said ring, the last mentioned antifriction balls being arranged to contact with the said annular flat surface and the said tapering inside wall to form a lower ball bearing between the said two members.

HENRY LUBÉ.